United States Patent
Baji

[11] Patent Number: 6,033,796
[45] Date of Patent: Mar. 7, 2000

[54] CHEMICAL REACTION BATTERY

[76] Inventor: Yasuo Baji, 1008-2, Shiohamahonmachi 2-chome, Yokkaichi-shi, Mie-ken, Japan

[21] Appl. No.: 09/017,663
[22] Filed: Feb. 3, 1998

[30] Foreign Application Priority Data

Feb. 4, 1997 [JP] Japan .................................. 9-037181

[51] Int. Cl.$^7$ ........................ H01M 10/34; H01M 4/36; H01M 12/00
[52] U.S. Cl. .................................. 429/59; 429/60; 429/9; 429/101
[58] Field of Search ................... 429/59, 60, 149, 429/220, 9, 27, 101

[56] References Cited

U.S. PATENT DOCUMENTS

| | | | |
|---|---|---|---|
| 4,008,099 | 2/1977 | Lindstrom | 429/59 |
| 4,296,184 | 10/1981 | Stachurski | 429/14 |
| 4,554,222 | 11/1985 | Zaromb | 429/19 |
| 4,565,749 | 1/1986 | Van Ommering et al. | 429/27 |

Primary Examiner—Maria Nuzzolillo
Assistant Examiner—Tracy Dove
Attorney, Agent, or Firm—Pillsbury Madison & Sutro LLP

[57] ABSTRACT

A battery having two chemical cells. A positive electrode of a first cell is composed of a first catalyst which reduces ions in an electrolyte and generates gas, and a negative electrode of a second cell is composed of a second catalyst which oxidizes the gas generated by the positive electrode of the first cell and generates ions as an active material of the negative electrode of the second cell. A gas-emitting surface of the positive electrode of the first cell and a gas-absorbing surface of the negative electrode of the second cell define a sealed chamber, and the positive electrode of the first cell and the negative electrode of the second cell are electrically connected to move the ions in the electrolyte of the first cell to the second cell without mixing the electrolytes or the like in the first and second cells.

8 Claims, 3 Drawing Sheets

CHEMICAL REACTION BATTERY

BACKGROUND OF THE INVENTION

1. Field of the Invention

The present invention relates to a battery, and more particularly, to a chemical reaction battery using liquid or gaseous active materials.

2. Description of Related Art

A chemical reaction battery has the arrangement that a pair of positive and negative active materials are provided in contact with an electrolyte. The battery reaction therein is oxidation-reduction reaction with the active materials of positive and negative electrodes. A lead storage battery used as an on-board type battery has been well known as one example of the chemical reaction battery. With the lead storage battery, dilute sulfuric acid ($H_2SO_{4(aq)}$) is used as the electrolyte, lead dioxide ($PbO_2$) is used as the active material of the positive electrode and lead (Pb) is used as the active material of the negative electrode. These active materials are both solid.

In other examples of the chemical reaction battery, liquid or gaseous active materials in addition to the solid active materials are used.

Daniell battery is well known as the battery using a liquid active material. With this battery, dilute sulfuric acid ($H_2SO_{4(aq)}$) is used as the electrolyte, copper sulfate solution ($CuSO_{4(aq)}$) is used as the active material of the positive electrode and solid zinc (Zn) is used as the active material of the negative electrode.

High pressure type nickel-hydrogen storage battery is one example of the battery using a gaseous active material. With this battery, pottasium hydroxide solution ($KOH_{(aq)}$) is used as the electrolyte, hydrogen gas ($H_{2(g)}$) is used as the active material of the negative electrode, which is absorbed with a platinum (Pt) catalyst electrode, and solid nickel oxyhydrate (NiOOH) is used as the active material of the positive electrode.

Batteries using solid active materials in both the positive and negative electrodes, such as the above-described lead storage battery, have been used widely, because, with the batteries using liquid active materials, such as Daniell battery, the separation of the liquid electrolyte and liquid active materials, and permeation of only the specific ions upon charging and discharging have not been effected sufficiently in spite of the provision of a separator. An unglazed earthware separator, for example, has been known as the separator for the Daniell battery. This separator, however, has the problem that the electrolyte ($H_2SO_{4(aq)}$) and active material solution ($CuSO_{4(aq)}$) are mixed together with time to generate self-discharging.

The above-described high pressure type nickel-hydrogen storage battery which uses the gaseous active material needs a pressure-resistant casing or hydrogen-occuludable alloy for storing gas as the active material, such as hydrogen. Consequently, it is difficult to provide inexpensive batteries with simple constructions so as not to be applied to general purposes.

However, in these days when the application of the batteries is expanding, the development of the batteries which use liquid or gaseous active materials and are free from the above-described problems, as well as the batteries which use only the solid active materials, has been demanded for increasing the kinds of the practical batteries and consequently, enlarging the choice thereof.

SUMMARY OF THE INVENTION

It is an object of the present invention to provide a battery which uses a liquid or gaseous active material and is applicable to general purposes.

In accordance with the present invention, the battery includes two cells, that is a first cell and second cell. A positive electrode of the first cell is composed of a first catalyst which reduces ions in an electrolyte to emit a gas. A negative electrode of the second cell is composed of a second catalyst which absorbes the gas emitted from the positive electrode of the first cell to be oxidized and ionized, thereby forming an active material of the negative electrode. A gas-emitting surface of the positive electrode of the first cell and a gas-absorbing surface of the negative electrode of the second cell define a sealed chamber. The positive electrode of the first cell and the negative electrode of the second cell are conducting or electrically connected to connect the above two cells in series, while the negative electrode of the first cell and the positive electrode of the second cell act as electrodes for discharging and charging, respectively.

Due to the battery reaction of the first cell, gas is generated from the positive electrode thereof. The gas generated is used in the battery reaction of the second cell as the active material of the negative electrode of the second cell. Electromotive force generated with the battery in accordance with the present invention corresponds to the sum of the electromotive forces of the first and second cells.

With the battery reaction, ions in the electrolyte of the first cell are substantially transmitted to the second cell. These ions are temporarily gasfied and then absorbed in the negative electrode of the second cell, which causes the electrolyte in the first cell not to mixed with the electrolyte or solution of the active material of the positive electrode in the second cell. The gas as the active material of the negative electrode of the second cell is supplied from the first cell so that the second cell does not need any pressure-resistant casing for storing gas.

With a first aspect of the present invention, the battery has a sealed casing composed of an electrically insulating material and a separating wall composed of an electrically insulating material, which divides the inside of the sealed casing into two compartments. The first cell includes a first electrolyte filling one of two compartments, a positive electrode composed of a first plate-like and gas-permeable catalyst, which is arranged such that an underside thereof is immersed in the first electrolyte, and a negative electrode immersed in the first electrolyte. The second cell includes a positive electrode, a second electrolyte or solution of active material of the positive electrode, which fills the other compartment, and a negative electrode composed of a plate-like and gas-permeable second catalyst, which is arranged such that an underside thereof is immersed in the second electrolyte or solution of active material of the positive electrode. The positive electrode is immersed in the second electrolyte or solution of active material of the positive electrode. An upper surface of the positive electrode of the first cell and an upper surface of the negative electrode of the second cell define a sealed chamber in an upper part of the sealed casing. The first catalyst and second catalyst are connected to each other with a conducting member to connect two cells in series.

With the above-described arrangement, both the upper surface of the positive electrode of the first cell and the upper surface of the negative electrode of the second cell are located upwardly of the liquid surface of the first and second electrolytes or the like, whereby the upper surface of the positive electrode of the first cell acts as a gas-emitting surface and the upper surface of the negative electrode of the second cell acts as a gas-absorbing surface. Since the upper surface of the positive electrode of the first cell and the upper surface of the negative electrode of the second cell are located upwardly of the liquid surface of the first and second electrolytes or the like, the first and second catalysts need not necessarily be formed to have a porous plate-like configuration. Any other catalysts, each having a fiber-like configuration and a large number of pores, can promote the battery reaction sufficiently.

In a preferred embodiment, the separating wall has such a height as to be spaced from an inner surface of a top wall of the sealed casing or is provided with at least one through hole for defining the sealed chamber.

The sealed casing and separating wall may be composed of an electrically insulating resin having a corrosion resistance against the electrolytes or solution of the active material of the positive electrode of the second cell.

With a second aspect of the present invention, the battery has a sealed casing composed of an electrically insulating material. The first and second catalysts are composed of gas-permeable and liquid-tight catalysts, each having a plate-like configuration. With these catalysts, the inside of the sealed casing is divided in a liquid-tight state into three chambers which are adjacent to each other horizontally. A resultant first cell includes a first electrolyte which fills a first chamber defined by the first catalyst and the above-described sealed casing, a positive electrode composed of the first catalyst and a negative electrode immersed in the first electrolyte. A second cell includes a positive electrode, a second electrolyte or solution of an active material of the positive electrode, which fills a second chamber defined by the second catalyst and the above-described sealed casing, and a negative electrode composed of the second catalyst. The positive electrode is immersed in the second electrolyte or the solution of the active material of the positive electrode. The first and second catalysts and sealed casing define the sealed chamber between the first and second chambers. The first and second catalysts are connected to each other with a conducting member, thus connecting both cells in series.

The surface of the first catalyst, which faces the sealed chamber, acts as a gas-emitting surface, and the surface of the second catalyst, which faces the sealed chamber, acts as a gas-absorbing surface. By composing both of the positive electrode of the first cell and the negative electrode of the second cell of gas-permeable and liquid-tight catalysts, the first and second electrolytes or the like in the first and second chambers can be prevented from leaking from the positive electrode of the first cell and the negative electrode of the second cell to the sealed chamber, and consequently, the posture of the battery is not so limited. In addition, the first and second chambers can be partly defined by the plate-like first and second catalysts which respectively serve as the positive electrode of the first cell and the negative electrode of the second cell, without providing any separating wall, which enables the simple construction of the battery.

In a preferred embodiment, the first and second catalysts are respectively composed of a porous catalyst.

The sealed casing may be composed of an electrically insulating resin having a corrosion resistance against the electrolytes or solution of the active material of the positive electrode of the second cell.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Hereinafter, the present invention will be explained in detail.

Figure 1:
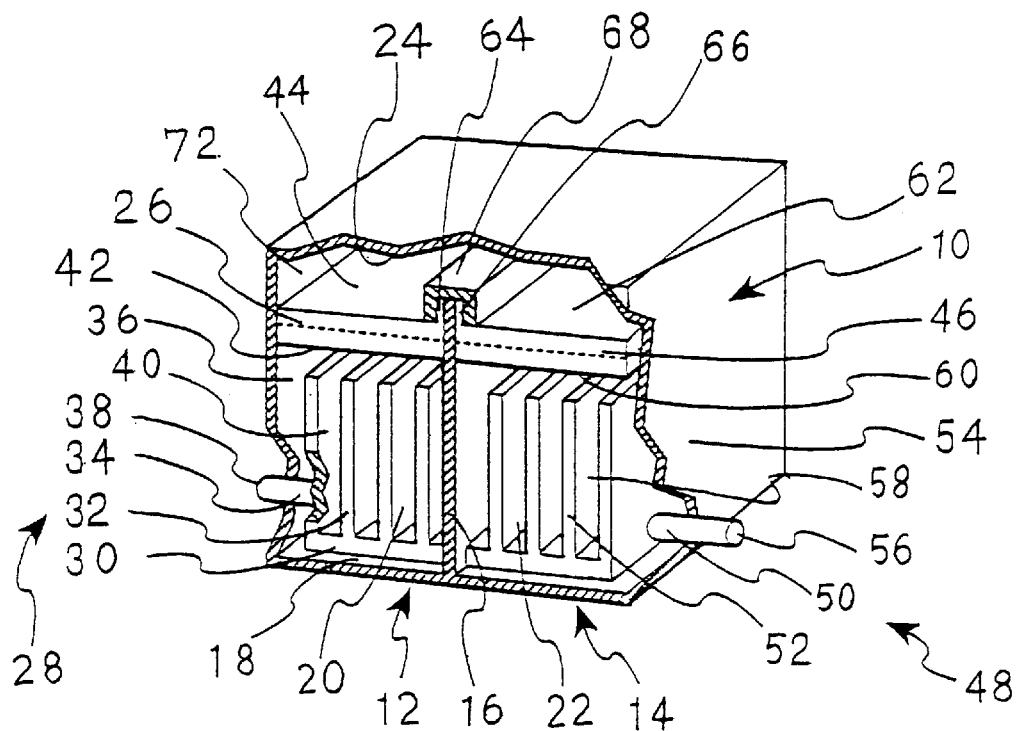
FIG. 1 is a partly cut away perspective view of a first embodiment of a battery in accordance with the present invention.

First embodiment:

FIG. 1 illustrates a first embodiment of a battery in accordance with the present invention. As shown, a casing 10 having a rectangular prism-like configuration, which acts as a sealed casing, includes a first cell 12 and second cell 14. The casing 10 is composed of an acid resistant and electrically insulating resin, and has a substantially sealed arrangement. Within the casing 10, a separating wall 16 stands upright on a bottom wall 18, thus defining two, left and right, compartments 20 and 22. The separating wall 16 has such a height as to be spaced from a top wall 24 of the casing 10.

In the compartment 20 on the left side of the separating wall 16, a positive electrode 26 of the first cell 12 is disposed in the upper part thereof. The positive electrode 26 is composed of platinum (Pt) sponge and has a rectangular configuration, thus covering the compartment 20.

In the compartment 20, a negative electrode 28 of the first cell 12 is accommodated. The negative electrode 28 is composed of zinc (Zn) and includes a horizontal plate 30 and a plurality of vertical plates 32 which are arranged in parallel with each other and jointed to the horizontal plate 30, thus acting as an active material of the negative electrode of the first cell 12. By virtue of the plurality of vertical plates 32, the surface area of the negative electrode 28 is enlarged, and the dissolution of zinc as the active material is effected sufficiently. A rod-like part 34 is provided so as to project horizontally from one of the vertical plates 32, which faces a side wall 36 of the casing 10, and penetrate the side wall 36. A projecting end 38 of the rod-like part 34 acts as a negative terminal of the battery.

Dilute sulfuric acid ($H_2SO_{4(aq)}$) as an electrolyte 40 is poured into the compartment 20 from an inlet opening (not shown). The amount of the electrolyte 40 poured is adjusted such that an under surface 42 of the positive electrode 26 is immersed therein and that an upper surface 44 of the positive electrode 26 is located upwardly of the liquid surface of the electrolyte 40 (shown by a dotted line in the drawing).

In the right-hand compartment 22 of the casing 10, a negative electrode 46 of the second cell 14, which has a configuration and composition identical to those of the positive electrode 26 of the first cell 12, is provided.

In the compartment 22, a positive electrode 48 of the second cell 14 is accommodated. The positive electrode 48 is composed of copper (Cu) and has a configuration substantially identical to that of the negative electrode 28 of the first cell 12. A rod-like part 50 is provided so as to project horizontally from one of vertical plates 52, which faces a side wall 54 of the casing 10, and penetrates the side wall 54. A projecting end 56 of the rod-like part 50 acts as a positive terminal of the battery.

Copper sulfate solution ($CuSO_{4(aq)}$) as a solution 58 of an active material of the positive electrode 52 is poured into the compartment 22 from an inlet opening (not shown). The amount of the solution 58 is adjusted such that an under surface 60 of the negative electrode 46 is immersed therein and that an upper surface 62 of the negative electrode 46 is located upwardly of the liquid surface of the solution 58 (shown by a dotted line in the drawing).

At side ends of the positive electrode 26 of the first cell 12 and the negative electrode 46 of the second cell 14, which are respectively located on both sides of the separating wall 16, thick-walled parts 64 and 66 are provided. These thick-walled parts 64 and 66 are held together with a conducting member 68 having a U-shaped cross-section. The conducting member 68 is composed of a conductive material such as copper (Cu) or iron (Fe), which is plated with platinum, and electrically connects the positive electrode 26 of the first cell 12 to the negative electrode 46 of the second cell 14, whereby the cells 12 and 14 are connected in series.

In the present embodiment, the separating wall has such a height as to be spaced from the top wall of the casing. Alternatively, the separating wall may have at least one of through hole for defining the sealed chamber.

Figure 2:
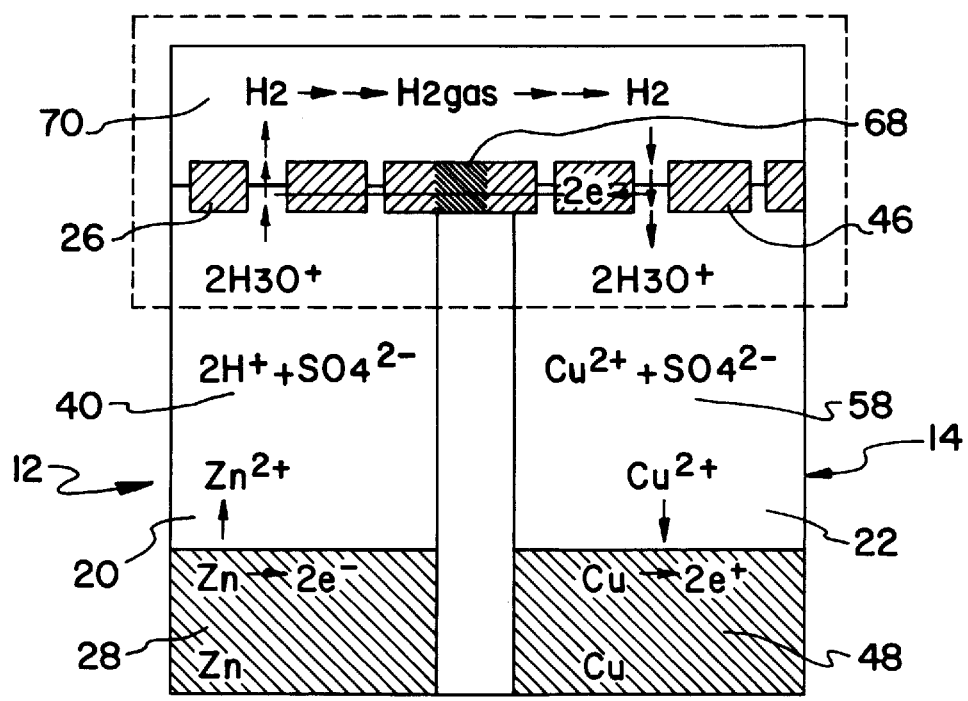
FIG. 2 is a schematic diagram of the first embodiment of the battery.

Hereinafter, the operation of the battery thus arranged will be explained. FIG. 2 is a schematic diagram of the battery, which explains the battery reaction therein.

The first cell 12 has the construction identical to that of so called Voltaic cell. Zinc ($Zn_{(s)}$) of the negative electrode 28 emits a negative charge, and resultant $Zn^{2+}$ dissolves in the electrolyte 40, which results in $H_3O^+$ in the electrolyte 40 shifting to the positive electrode 26, and being reduced on the surface of the platinum sponge by the catalysis thereof. Resulting $H_{2(g)}$ is emitted from the upper surface 44 of the positive electrode 26. This reaction is expressed by the following reaction equation (1) (the rightward arrow indicates the reaction in discharging, and the leftward arrow indicates the reaction in charging).

The electromotive force developed between the positive electrode 26 and negative electrode 28 of the first cell 12 due to this reaction, which is obtained from the standard electrode potential or the like, is 0.763 V.

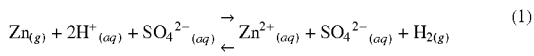
(1)

In the second cell 14, $H_{2(g)}$ generated in the positive electrode 26 of the first cell 12 reaches the negative electrode 46 without leaking out from a sealed chamber 70 defined by the casing 10, positive electrode 26 of the first cell 12, and negative electrode 46 of the second cell 14, and is oxidized on the surface of platinum sponge of the negative electrode 46. Resultant $H_3O^+$ dissolves in the solution 58 ($CuSO_{4(aq)}$). The reaction of emitting a positive charge to the positive electrode 26, and generating $H_{2(g)}$, and the reaction of oxidizing $H_{2(g)}$ by the negative electrode 46 (receiving a positive charge) and generating $H_3O^+$ are thermodynamically reversible reactions, because the positive electrode 26 and negative electrode 46 are electrically connected by the conducting member 68. Due to the generation of $H_3O^+$, $Cu^{2+}$ in the solution 58 deposits as metal copper on the positive electrode 48, because at a normal temperature, copper is stabler in a metal state. Thus, in the second cell 14, the reaction expressed by the following equation (2) proceeds.

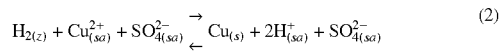
(2)

The electromotive force developed between the positive electrode 48 and negative electrode 46 of the second cell 14 due to this reaction is 0.347 V.

The electromotive force produced by the entire battery is 1.11 V, which is the sum of the electromotive forces of the first and second cells 12 and 14.

The equations (1) and (2) are rearranged to provide the following equation (3).

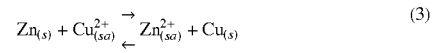
(3)

This equation (3) indicates the battery reaction of the conventional Daniell battery, where zinc ($Zn_{(g)}$) dissolves from a negative electrode thereof while copper ($Cu_{(g)}$) deposits on a positive electrode thereof. The part surrounded with a dotted line in FIG. 2 corresponds to a separator of the Daniell battery. The separator of the conventional Daniell battery, which is composed of unglazed earthware, or the like, however, has a problem that $H_2SO_{4(aq)}$ as an electrolyte is mixed with $CuSO_{4(aq)}$ as an active material of the positive electrode. In contrast, in the part of the battery of the present embodiment, which is surrounded with the dotted line, only the specific ions in the electrolyte 40 of the first cell 12 ($H^+$($H_3O^+$ ions in the electrolyte)) are gasified temporarily and react with the $CuSO_{4(aq)}$ as the solution 58 of the active material of the positive electrode 48 of the second cell 14 and consequently, the battery of the present embodiment is free from the problem of mixing of the electrolyte with the solution of the active material of the positive electrode and generating self-discharging, which has been encountered with the conventional Daniell battery.

To charge the battery of the present embodiment, a voltage not less than 1.11 V is applied between the terminals 38 and 56 such that a positive voltage is applied to the terminal 56, which results in the reactions indicated with the leftward arrows in the equations (1) and (2) proceeding to charge both the first and second cells 12 and 14.

Figure 3:
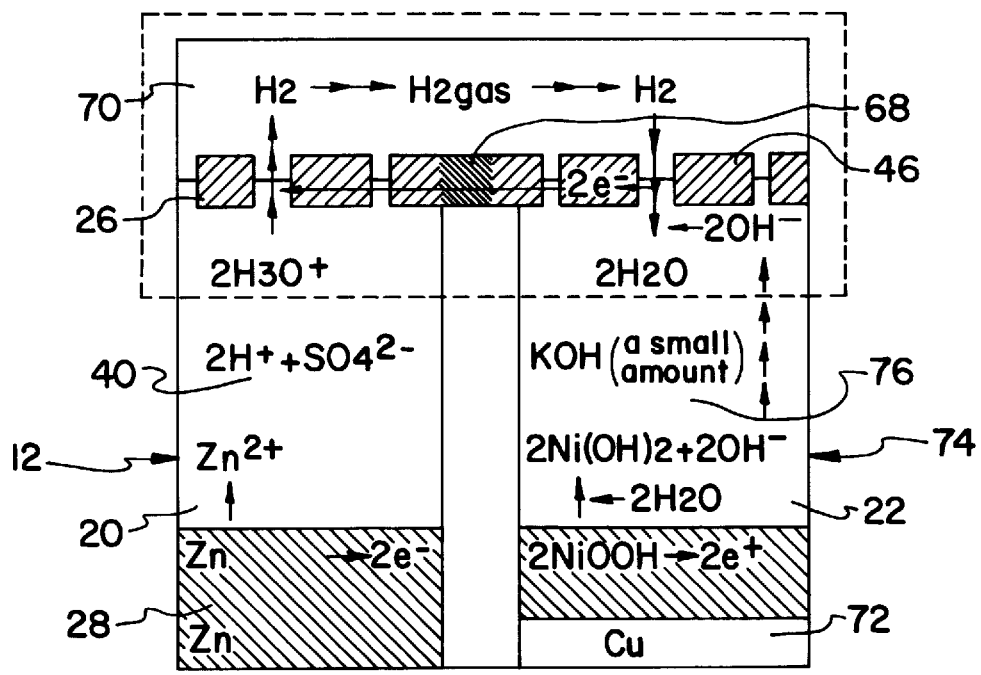
FIG. 3 is a schematic diagram of a second embodiment of a battery in accordance with the present invention.

Second embodiment:

FIG. 3 is a schematic diagram of the second embodiment of the present invention. In this drawing, parts which operate in substantially the same manners as those of the parts in FIGS. 1 and 2 are given the same numbers as in FIGS. 1 and 2, and the difference between the present embodiment and the first embodiment will be mainly explained. As shown, the configuration of the battery of the present embodiment is identical to that shown in FIG. 1 except for the material of the electrodes or the like. A positive electrode 72 of a second cell 74 is composed of copper (Cu) on which a layer of nickel oxyhidrate (NiOOH) is formed as the active material of the positive electrode 72. An electrolyte 76 is composed of $KOH_{(aq)}$ (a small amount of KOH added). Accordingly, the casing of this battery is composed of an acid-resistant and alkali-resistant material.

In this battery, NiOOH as the active material of the positive electrode 72 emits a positive charge to generate hydrolysis, thereby dissolving in the electrolyte 76. On the surface of platinum sponge of the negative electrode 46, $H_{2(g)}$ generated in the first cell 12 reacts on resultant $OH^-$. $H_2O$ generated is absorbed, and the battery reaction shown by the rightward arrow in the equation (4) proceeds. Due to this reaction, an electromotive force of about 1.35 V is developed between the positive and negative electrodes 46 and 72 of the second cell 74.

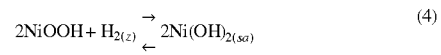
(4)

The electromotive force produced by the entire battery is 2.11 V, which is the sum of the electromotive forces of the first and second cells 12 and 74. To charge the battery, a voltage not less than 2.11 V is applied between the positive and negative electrodes 72 and 28 such that a positive voltage is applied to the electrode 72, which results in the reactions indicated with the leftward arrows in the equations (1) and (4) proceeding to charge both the first and second cells 12 and 74.

The second cell 74 has the construction identical to that of the above-described high pressure nickel-hydrogen storage battery. With the battery in accordance with the present embodiment, $H_{2(g)}$ as the active material of the negative electrode in the high pressure type nickel-hydrogen storage battery, is generated due to the battery reaction in the first cell 12. The $H_{2(g)}$ in the amount identical to that of $H_{2(g)}$ generated is absorbed by the negative electrode 46 of the second cell 74. Accordingly, no special member for storing $H_{2(g)}$, such as a pressure-resistant casing, is needed. Thus, with the present embodiment, the general purpose characteristic of battery is enhanced, as compared with that of the conventional nickel-hydrogen storage battery.

With the present embodiment, the negative electrode 28 of the first cell 12 is composed of zinc (Zn). Alternatively, iron (Fe) will do. In this case, the electromotive force of the first cell 12 is 0.44 V and that of the entire battery is 1.79 V.

Figure 4:
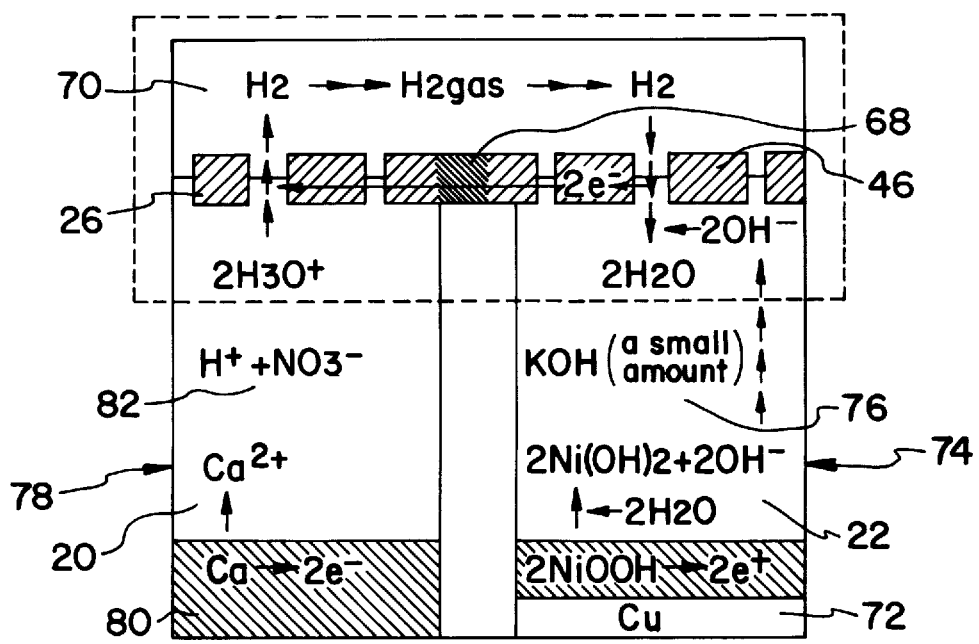
FIG. 4 is a schematic diagram of a third embodiment of a battery in accordance with the present invention.

Third embodiment:

FIG. 4 illustrates a schematic diagram of the third embodiment of the present invention. In this drawing, parts which operate in substantially the same manners as those of the parts in FIG. 3 are given the same numbers as in FIG. 3, and the difference between the present embodiment and the second embodiment will be mainly explained. As shown, a first cell 78 is different from the first cell 12 of the second embodiment illustrated in FIG. 3 in materials of the electrode or the like. Namely, a negative electrode 80 of the first cell 78 is composed of calcium (Ca) which acts as an active material of the negative electrode 80, and an electrolyte 82 is composed of nitric acid ($HNO_{3(aq)}$).

In operation, $Ca_{(g)}$ of the negative electrode 80 emits a negative charge. Resultant $Ca^{2+}$ dissolves in the electrolyte 82, and $H_3O^+$ in the electrolyte 82 is reduced on the surface of platinum sponge of the positive electrode 26 by the catalysis thereof. Resultant $H_{2(g)}$ is emitted from the positive electrode 26. This reaction is expressed by the equation (5). Due to this reaction, an electromotive force of 2.866 V is developed across the positive electrode 26 and negative electrode 80 of the first cell 78.

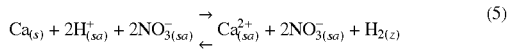

(5)

The electromotive force of the entire battery is about 4.2 V which is the sum of the electromotive forces of the first cell 78 and that of the second cell 74. To charge the battery, a voltage not less than about 4.2 V is applied between the positive electrode 72 and negative electrode 80 of the battery such that a positive voltage is applied to the electrode 72. As a result, the reactions shown by the leftward arrows in the equations (4) and (5) proceed, and consequently both the first and second cells 78 and 74 are charged.

Figure 5:
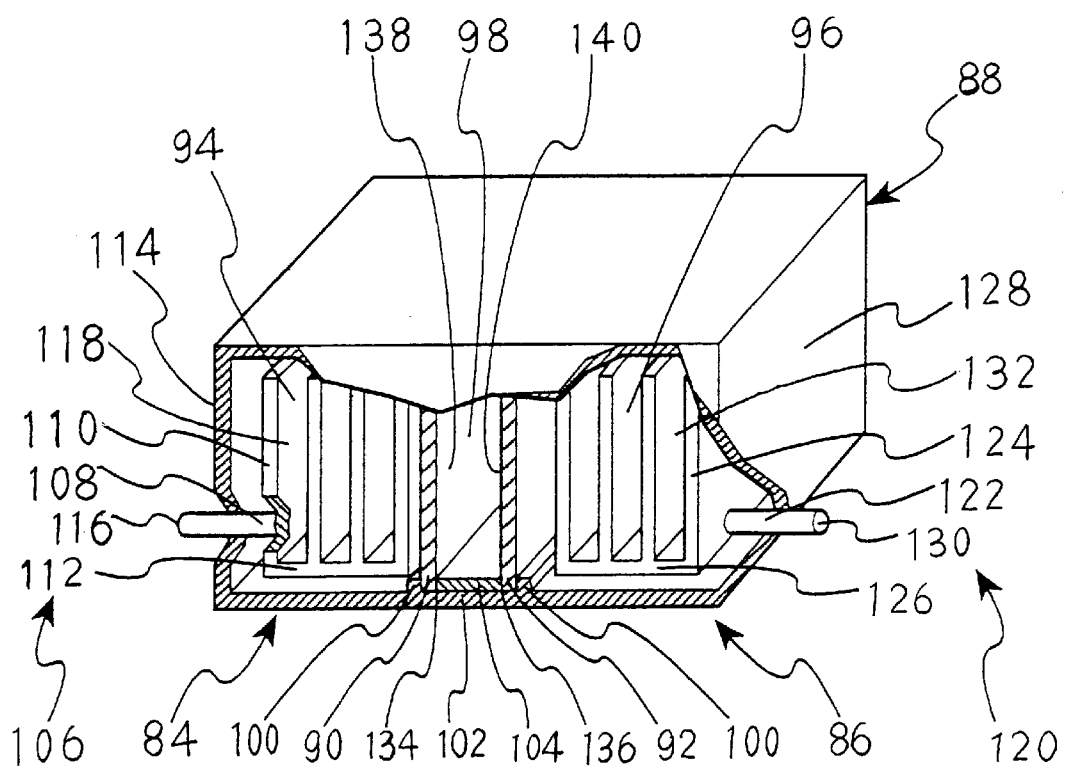
FIG. 5 is a partly cut away perspective view of a fourth embodiment of a battery in accordance with the present invention.

Fourth embodiment:

FIG. 5 illustrates the fourth embodiment of the present invention. As shown, a casing 88 as a sealed casing, which has a rectangular prism-like configuration, includes a first cell 84 and second cell 86. The casing 88 is composed of an acid-resistant, alkali-resistant and electrically insulating resin, and has a substantially sealed arrangement. The inside of the casing 88 is divided with two walls 90 and 92 to three adjacent chambers 94, 96 and 98. The walls 90 and 92 are positioned by stepped parts 100 provided on an inner surface 102 of the casing 88, and a conducting member 104 described later. With this arrangement, the contact area of the walls 90 and 92 with the casing 88 increases, thus dividing the chambers 94, 96 and 98 in a liquid-tight condition.

The walls 90 and 92 are respectively composed of a porous catalyst which is formed into a flat plate-like configuration. The porous catalyst includes a porous conductive material such as nickel or carbon, and a platinum catalyst layer formed thereon. One wall 90 (left wall in FIG. 5) acts as a positive electrode of the first cell 84 while the other wall 92 (right wall in FIG. 5) acts as a negative electrode of the second cell 86.

The first cell 84 includes the chamber 94 (left chamber in FIG. 5) which is defined by the wall 90 composed of the first catalyst and the casing 88. A negative electrode 106 composed of zinc is disposed within the chamber 94. The negative electrode 106 has the arrangement substantially identical to that of the negative electrode 28 of the first cell 12 of the first embodiment. A rod-like part 108 projects horizontally from a vertical plate 110 connected to a horizontal plate 112, penetrates a side wall 114 of the casing 88, and projects outwardly. A projecting end 116 of the rod-like part 108 acts as a negative terminal of the battery thus arranged.

An aquaous solution of $H_2SO_{4(aq)}$ as an electrolyte 118 is poured from an inlet opening (not shown) into the chamber 94 of the first cell 84, whereby the negative electrode 106 is immersed in the electrolyte 118.

The second cell 86 includes the chamber 96 (right chamber in FIG. 5) which is defined by the wall 92 composed of the second catalyst and acting as a dividing wall, and the casing 88. A positive electrode 120 composed of copper, which has the configuration approximately identical to that of the positive electrode 48 of the second cell 14 of the first embodiment is disposed within the chamber 96. A rod-like part 122 projects horizontally from a vertical plate 124 connected to a horizontal plate 126, penetrates a side wall 128 of the casing 88, and projects outwardly. A projecting end 130 of the rod-like part 122 acts as a positive terminal of the battery thus arranged.

$CuSO_{4(aq)}$ as a positive electrode-active material solution 132 is poured from an inlet opening (not shown) into the chamber 96 of the second cell 86.

The conducting member 104 is formed of a metallic frame which is fitted along the inner surface 102 of the casing 88, thus defining the third chamber 98 as a sealed chamber with the positive electrode 90 of the first cell 84 and the negative electrode 92 of the second cell 86. One side edge 134 of the metallic frame 104 abuts the positive electrode 90 of the first cell 84 and the other side edge 136 of the metallc frame 104 abuts the negative electrode 92 of the second cell 86, thus supporting these electrodes 90 and 92. The metallic frame 104 thus arranged acts as a conducting member for electrically connecting the positive electrode 90 and negative electrode 92, and consequently, the first cell 84 and second cell 86 are connected in series. The electromotive force is obtained from the projecting end 116 of the negative electrode 106 of the first cell 84 and the projecting end 130 of the positive electrode 120 of the second cell 86.

With the fourth embodiment thus arranged, $H_{2(g)}$ generated due to the battery reaction of the first cell 84 is emitted from a surface 138 (gas emitting surface) of the positive electrode 90, which faces the third chamber 98, and then, absorbed by a surface 140 (gas absorbing surface) of the negative electrode 92 of the second cell 86, which faces the third chamber 98, and consequently supplied as an active material of the negative electrode in the battery reaction in the second cell 86. By using the porous catalysts as the positive electrode 90 of the first cell 84 and the negative electrode 92 of the second cell 86, $H_2SO_{4(aq)}$ and $CuSO_{4(aq)}$ filling the first and second chambers 94 and 96 can be prevented from leaking out into the third chamber 98, and consequently, the battery can be applied to various uses without limiting the posture of the battery specifically.

The battery of the present embodiment has the arrangement like a Daniell battery. Alternatively, the second cell 86 of the present embodiment can have the arrangement like the second cell 74 of the second embodiment. The first cell 84 of the present embodiment can have the arrangement like the first cell 78 of the third embodiment, or the combination of the first cell and second cell may be selected arbitrarily.

The porous catalyst is not limited to that described in the present embodiment. Any other porous catalyst capable of oxidizing and reducing ions in the electrolytes or the like will do. In addition, the catalysts in the first cell and second cell may be composed of different materials.

Furthermore, a plurality of batteries of the preceding embodiments may be connected in series. With this arrangement, a high voltage can be obtained.

While the invention has been described in connection with what are considered prsently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A battery comprising:
a sealed casing composed of an electrically insulating material and having a separating wall composed of an electrically insulating material for dividing an inside of said sealed casing into a first compartment as a first cell and a second compartment as a second cell, said first cell including a first electrolyte which fills said first compartment, a positive electrode composed of a first catalyst which reduces ions in said first electrolyte to emit a gas, and a negative electrode immersed in said first electrolyte, said positive electrode of said first cell having a plate-like configuration, being gas-permeable, and being arranged such that an underside thereof is immersed in said first electrolyte, said second cell including a negative electrode composed of a second catalyst which absorbs and oxidizes said gas emitted by said positive electrode of said first cell, and generates ions, thereby forming an active material for said negative electrode of said second cell, a positive electrode, and a second electrolyte or solution of an active material of said positive electrode of said second cell, which fills said second compartment, said positive electrode of said second cell being immersed in said second electrolyte or solution of said active material of said positive electrode, said negative electrode of said second cell having a plate-like configuration, being gas-permeable, and being arranged such that an underside thereof is immersed in said second electrolyte or solution of said active material of said positive electrode, an upper surface of said positive electrode of said first cell, which emits said gas, and an upper surface of said negative electrode of said second cell, which absorbs said gas, defining a sealed chamber in an upper part of said sealed casing, said positive electrode of said first cell and said negative electrode of said second cell being in a conducting state to connect said first cell and said second cell in series such that said first catalyst and said second catalyst are connected with a conducting member, and said negative electrode of said first cell and said positive electrode of said second cell acting as electrodes for discharging and charging, respectively.

2. A battery as claimed in claim 1, wherein said separating wall has such a height as to be spaced from an inner surface of a top wall of said sealed casing.

3. A battery as claimed in claim 1, wherein said separating wall has at least one through hole defining said sealed chamber.

4. A battery as claimed in claim 1, wherein said sealed casing and said separating wall are respectively composed of an electrically insulating resin having a corrosion resistance against said first and second electrolyte or said solution of said active material of said positive electrode.

5. A battery comprising:
a sealed casing composed of an electrically insulating material and having a first wall composed of a first catalyst and a second wall composed of a second catalyst for dividing an inside of said sealed casing into three adjacent chambers in a liquid-tight state, each wall having a plate-like configuration and being composed of a gas permeable and liquid-tight catalyst, a first chamber of said three adjacent chambers, which is defined by said first catalyst and said sealed casing, acting as a first cell, a second chamber of said three adjacent chambers, which is defined by said second catalyst and said sealed casing, acting as a second cell, said first cell including a first electrolyte which fills said first chamber and a negative electrode immersed in said first electrolyte, said first catalyst being composed of such a catalyst as to reduce ions in said first electrolyte to emit gases, thereby serving as a positive electrode of said first cell, said second cell including a positive electrode and a second electrolyte or solution of an active material of said positive electrode of said second cell, which fills said second chamber, said positive electrode of said second cell being immersed in said second electrolyte or said solution of said active material of said positive electrode, a negative electrode of said second cell being composed of said second catalyst, said second catalyst being operative to absorb and oxidize said gas emitted by said positive electrode of said first cell, and to generate ions, said second cell using said gas as an active material of said negative electrode, said first catalyst and said second catalyst defining a sealed chamber between said first chamber and said second chamber, said first catalyst and said second catalyst being connected with a conducting member to connect said first cell and said second cell in series, and said negative electrode of said first cell and said positive electrode of said second cell acting as electrodes for discharging and charging, respectively.

6. A battery as claimed in claim 2, wherein said first catalyst and second catalyst are respectively composed of a porous catalyst.

7. A battery as claimed in claim 2, wherein said conducting member abuts and supports said first catalyst and second catalyst.

8. A battery as claimed in claim 2, wherein said sealed casing is composed of an electrically insulating resin having a corrosion resistance against said first and second electrolyte or said solution of said active material of said positive electrode.

* * * * *